(12) United States Patent  (10) Patent No.: US 7,937,609 B2
Braeker et al.  (45) Date of Patent: May 3, 2011

(54) DISASTER RECOVERY IN A DATA PROCESSING SYSTEM

(75) Inventors: Bernd Braeker, Zornheim (DE); Peter Lais, Lichtenstein (DE)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/835,607

(22) Filed: Aug. 8, 2007

(65) Prior Publication Data

US 2008/0201607 A1    Aug. 21, 2008

(30) Foreign Application Priority Data

Oct. 24, 2006    (EP) .................................... 06122833

(51) Int. Cl.
*G06F 11/00*    (2006.01)
(52) U.S. Cl. .............................................. 714/2; 714/6
(58) Field of Classification Search ................ 714/6
See application file for complete search history.

(56) References Cited

U.S. PATENT DOCUMENTS

| | | | |
|---|---|---|---|
| 7,334,157 B1* | 2/2008 | Graf et al. ....................... | 714/13 |
| 2007/0043969 A1* | 2/2007 | Schneider ......................... | 714/6 |
| 2008/0091746 A1* | 4/2008 | Hatasaki et al. ............... | 707/204 |

FOREIGN PATENT DOCUMENTS

EP    06122833.4    10/2006

* cited by examiner

*Primary Examiner* — Michael C Maskulinski
(74) *Attorney, Agent, or Firm* — George R. McGuire; Blaine T. Bettinger; Bond Schoeneck & King, PLLC

(57) ABSTRACT

The present invention relates to a method of disaster recovery in data processing systems and to a recovery system. The invention allows for easy, fast and reliable recovery of a data processing system in a disaster situation. Unmodified backup data is stored to a target data processing system, the hardware of the target data processing system being different from the hardware of the source data processing system, from which the backup data originated. The stored backup data is then adapted to the hardware of the target data processing system by a remote recovery system using previously obtained reference data.

24 Claims, 3 Drawing Sheets

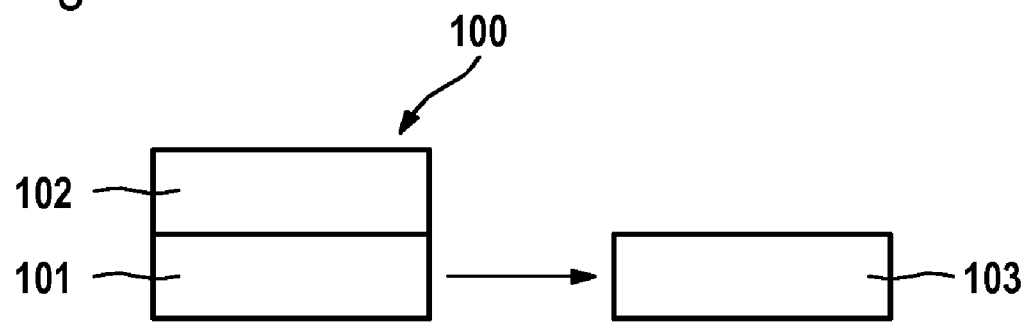
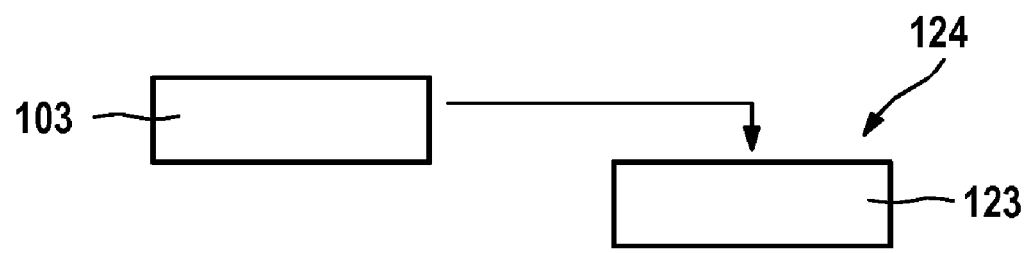
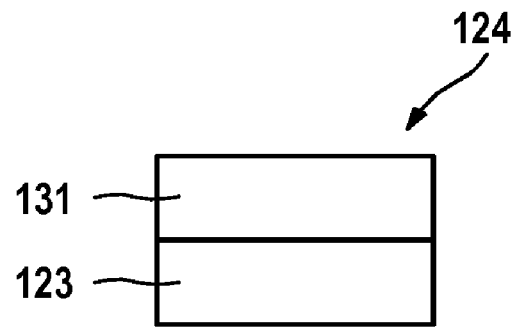

DISASTER RECOVERY IN A DATA PROCESSING SYSTEM

RELATED APPLICATIONS

This application claims foreign priority benefits under Title 35, United States Code, Section 119 of European Patent Application No. 06122833.4, filed Oct. 24, 2006, the contents of which are hereby incorporated by reference.

FIELD OF THE INVENTION

The present invention relates to a method of disaster recovery in data processing systems and to a recovery system. More particularly, the present invention relates to a disaster recovery in a data processing system using backup data originating from a source data processing system, the hardware of the source data processing system being different from the hardware of the target data processing system to which the unmodified backup data is stored.

BACKGROUND OF THE INVENTION

Data processing systems typically require a large amount of data storage. Customer data, or data generated by users within the data processing system, usually occupy a great portion of this data storage. Effective data processing systems also provide backup copies of this user data to ensure against a loss of such data. For most businesses, any loss of data in their data processing systems is catastrophic, severely impacting the success of the business. To further protect customer data, some data processing systems extend the practice of making backup recovery copies to allow disaster recovery. In disaster recovery systems, a recovery copy of the customer data is kept at a site remote from the primary storage location. If a disaster strikes the primary storage location, the customer data can be retrieved or "recovered" from the recovery copies located at the remote site.

If backup data obtained from a data processing system employing a certain hardware environment is restored to a new data processing system that uses different hardware, in most cases the system cannot be used until the restored data is manually customized to the new hardware. For example, new hardware drivers have to be installed.

SUMMARY OF THE INVENTION

It is an object of the present invention to provide a disaster recovery technique that allows for easy, fast and reliable recovery of a data processing system in a disaster situation.

In accordance with one aspect of the invention, there is provided a method of disaster recovery in a data processing system, the steps comprising storing backup data generated from a source data processing system having first hardware to a target data processing system having second hardware, the first hardware being different from the second hardware, and the stored backup data being unmodified; and adapting the backup data to the second hardware of the target data processing system by a remote recovery system using previously obtained reference data.

In accordance with another aspect of the invention, there is provided a data processing program for execution in a computer comprising software code portions for performing the steps of storing backup data generated from a source data processing system having first hardware to a target data processing system having second hardware, the first hardware being different from the second hardware, and the stored backup data being unmodified; and adapting the backup data to the second hardware of the target data processing system by a remote recovery system using previously obtained reference data when the program is run on the computer.

In accordance with yet another aspect of the invention, there is provided a disaster recovery system for a data processing system, using backup data originating from a source data processing system, first hardware of the source data processing system being different from second hardware of a target data processing system to which the unmodified backup data is stored, the recovery system comprising means for adapting the backup data to the second hardware of the target data processing system using previously obtained reference data.

Prior art solutions adapt the backup data to the new hardware during the installing process itself (a "one-step-approach"). A basic concept of the present invention is to suggest a "two-step-approach", in which the unmodified backup data is stored to new hardware in a first step and the stored data is adapted to the target hardware system in a subsequent second step. Another basic idea of the present invention is the use of reference information, which is obtained prior to the recovery step.

The major advantage of the new technique is that a very short recovery time can be achieved (minutes instead of hours or even days). The recovery process can be prepared without knowing what hardware the customer is using either before or after a disaster situation occurs. To carry out the recovery process, the customer needs only to provide a state of the art backup file.

In a preferred embodiment of the invention, the reference data comprises hardware-specific data, in particular, hardware-specific configuration data and hardware driver data, from a reference data processing system, the reference data processing system being substantially identical with the target data processing system. By this means, a very reliable recovery process can be achieved.

Preferably the invention is applicable for a disaster recovery of a Microsoft Corporation Windows® 2000 Server or Microsoft® Windows Servers 2003 system because of hardware failure. The present invention allows an easy, fast and reliable way of carrying out such a recovery on completely different hardware.

BRIEF DESCRIPTION OF THE DRAWINGS

A complete understanding of the present invention may be obtained by reference to the accompanying drawings, when considered in conjunction with the subsequent detailed description, in which:

FIG. 1 is a representation that illustrates a backup of a data processing system;

FIG. 4 is a representation that illustrates the restoring of unmodified backup data to new hardware of a target data processing system;

FIG. 7 is a representation that illustrates a "repaired" target data processing system after a complete disaster recovery, according to the present invention.

DETAILED DESCRIPTION OF THE PREFERRED EMBODIMENTS

A data processing system comprises particular hardware (e.g., processor type, motherboard, main memory, peripheral components, etc.) and a particular operating system (e.g., Microsoft Windows NT®, Windows 2000, Windows 2003, Windows XP®, etc.) to be executed on the hardware of that data processing system. For example, a data processing system 100 comprises Intel Corporation x86 processor-based server hardware 101 and a Microsoft Windows Server 2003 operating system 102 (German language), Standard Edition with Service Pack 1 installed (see FIG. 1). Backup data 103 of such a data processing system (source system) can be created e.g., by means of imaging software such as Symantec Corporation's Ghost®, Acronis Inc.'s True Image Server, IBM's Tivoli Storage Manager, Symantec Corporation's Backup Exec® or Computer Associates' ArcServe®, which create an image of the hard drive of the source system.

In case of a physical failure of the source system's hardware, e.g., due to a fire or a hard disk head crash, the old hardware will be replaced. The previously created backup can be restored to the new hardware and operation of the new data processing system can continue. In cases where the new hardware differs from the previously used hardware, the restored system normally will not properly start, because the backup data does not include configuration information and drivers for the new hardware. The present invention now describes the use of a new disaster recovery technique.

Figure 2:
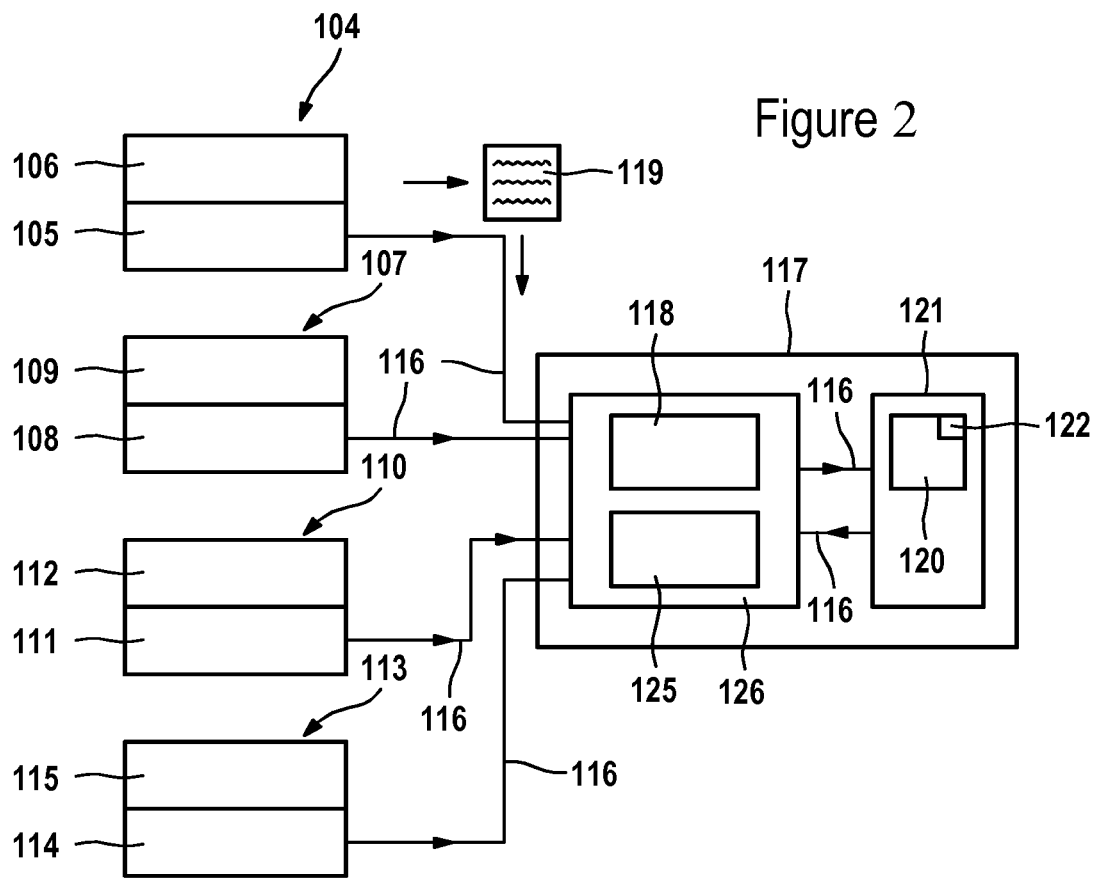
FIG. 2 is a representation that illustrates the obtaining of reference data by means of a reference data creating module of a recovery system according to the present invention.

For this purpose, a number of reference data processing systems have to be prepared. This is preferably done well before a disaster situation occurs. For example (see FIG. 2) a first reference data processing system 104 comprises an Intel x86 processor based server hardware 105 and a Microsoft Windows 2003 Server operating system 106 (German language), Standard Edition with Service Pack 1 installed, a second reference data processing system 107 comprises an (Advanced Micro Devices (AMD) Athlon® processor based server hardware 108 and a Microsoft Windows 2003 Server operating system 109 (English language), Enterprise Edition with Service Pack 2 installed, a third reference data processing system 110 comprises an Intel x86 processor based server hardware 111 and a Microsoft Windows 2000 Server operating system 112 (German language), Advanced Edition with no service pack installed, and a fourth reference data processing system 113 comprises a AMD Athlon processor based server hardware 114 and a Microsoft Windows NT Servers® operating system 115 (German language), Enterprise Edition with Service Pack 1 installed. In each reference data processing system 104, 107, 110, and 113 all necessary drivers are installed and updated.

In order to carry out the recovery process according to the present invention, reference data has to be created using the previously prepared reference data processing systems (reference installations) 104, 107, 110, and 113 as described above. For this purpose, a first reference data processing system 104 is booted in a way that a network communication 116 between the reference data processing system and a remote recovery system 117 is allowed, and the local drives of the reference data processing system can be used as shared drives by the recovery system. Recovery system 117, e.g., a personal computer or a distributed system with its components connected through network communication 116, includes a reference data creating module 118. Reference data creating module 118 automatically establishes a connection between recovery system 117 and reference data processing system 104. Furthermore, reference data creating module 118 obtains information 119 about the hardware and software configuration of reference data processing system 104. Obtaining of information 119 can be accomplished either automatically by reference data creating module 118 or manually by the user of recovery system 117.

In a next step, reference data creating module 118 automatically creates reference data from information 119, the reference data characterizing the combined hardware and software installation of reference data processing system 104. Preferably reference data creating module 118 creates a reference data object 120, e.g., a data folder (reference folder), containing configuration files from the root directory of the hard disk of reference data processing system 104, and the complete system directory, including hardware driver files, of the reference data processing system.

Figure 3:
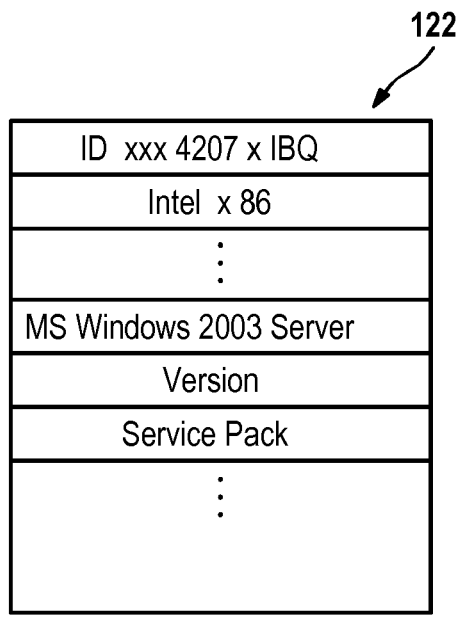
FIG. 3 is a representation that illustrates an ID token of a reference data object, created by a reference data creating module.

The system directory contains the operating system registry, i.e., the hardware-specific configuration data, which will be required for recovery in a later step. Reference data creating module 118 then stores created reference data object 120 in a dedicated reference data storage 121, e.g., an external or internal database, together with an identifier token 122. Identifier token 122 comprises information about the hardware and software configuration of reference data processing system 104 and is used in a later step for fast identification and the selection of reference data object 120. An example of an identifier token having the characteristics of identifier token 122 is illustrated in FIG. 3. The above described procedure is repeated until reference data objects 120 of all reference data processing systems 104, 107, 110, and 113 have been obtained.

A preferred method of creating a set of reference data objects 120 for a particular hardware installation is to create reference data with a "no service pack" level of each operating system. The operating system is then updated to the next patch level and the next reference data is created. In this way a large number of reference data are obtained, covering many possible combinations of hardware, operating systems and patch levels.

In the case of a disaster (see above), in FIG. 4 unmodified backup data 103 is transferred to and stored on hardware 123 of a data processing system 124 (target system), where hardware 123 is different from the hardware 101 of data processing system 100 (source system) from which the backup data originated. This step can be referred to as a restoring step. For example, hardware 123 of target system 124 comprises AMD Athlon processor-based server hardware and a Microsoft Windows 2003 Server operating system (English language), Enterprise Edition with Service Pack 2 installed; i.e., target system 124 corresponds to reference data system 107. The above restoring step can be carried out using the known backup software. Prior to restoring backup data 103 to target system 124, the hardware of the target system is prepared accordingly (e.g., creating disk arrays and partitions, installing required customer-specific adapters, etc.).

Figure 5:
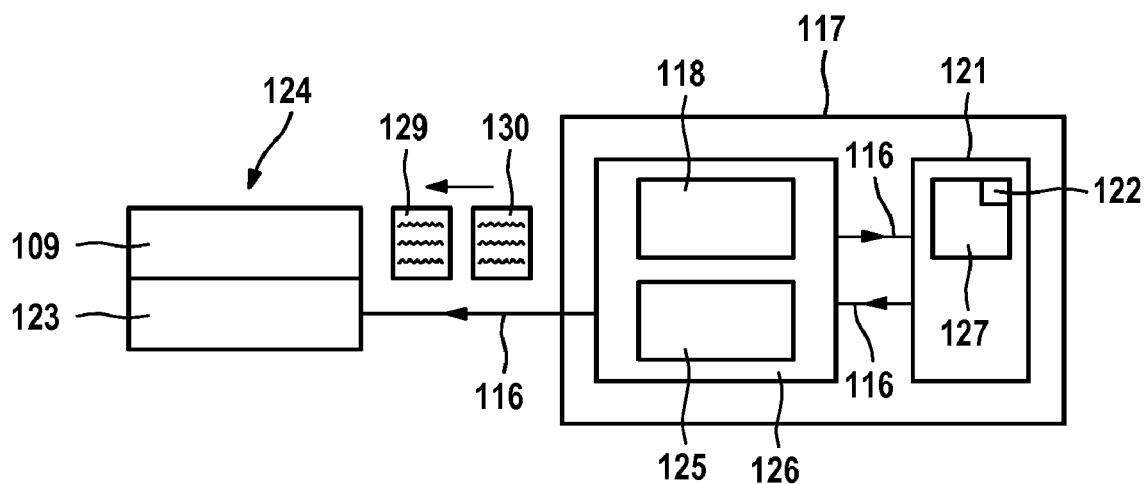
FIG. 5 is a representation that illustrates the "repairing" of a target data processing system by means of a recovery module of a recovery system according to the present invention.

Referring to FIG. 5, target system 124 is booted such that network 116 communication between the target system and remote recovery system 117 is allowed, and the local drives of the target system can be used as shared drives by the recovery system. A recovery module 125 is executed in recovery system 117. Recovery module 125 and reference data creating module 118 are preferably part of recovery software 126 executed in recovery system 117. Alternatively, reference data creating module 118 may be implemented as a stand alone application.

Recovery module 125 establishes a connection between the target system 124 and recovery system 117. Recovery module 125 then obtains information about the hardware and software configuration of target system 124. Obtaining of the information can be accomplished either automatically by recovery module 125 or manually by a user of recovery system 117. Preferably the recovery module 125 obtains the information automatically. In this case, information about the operating system version is preferably obtained from the operating system registry, and information about the operating system patch level and language are preferably obtained from the file kernel32.dll in the system directory.

The user of recovery system 117 is then requested to select the kind of "repairing" or "fixing" procedure. For example, the user may choose either "small repair" or "full repair". Alternatively, the kind of repair is preselected or selected automatically by means of recovery module 125, depending on the hardware and software configuration of source system 100 and/or target system 124.

In a preparatory step, it is assured that recovery module 125 gains access to the configuration of the target system's operating system 109. This can be achieved, for example, by recovery module 125 itself or by using external tools.

Recovery module 125 then establishes access to reference data storage 121, in which the previously created reference data for reference data processing system 104 is stored. Based on the previously obtained information about the hardware and software configuration of target system 124, recovery module 125 selects the appropriate reference data object 127 (reference folder) from reference data storage 121. For this purpose recovery module 125 searches identifier tokens 122 of stored reference data objects 120, 127.

In a preferred embodiment of the invention, if the information about the hardware and software configuration of target system 124 has been provided by user input, recovery module 125 additionally obtains the information automatically and compares the automatically obtained information with the user input information and the content of selected reference data object 127 to ensure that the correct reference data object has been selected.

If no stored reference data is available, recovery module 125 aborts the process with an error message. The process cannot continue until an appropriate set of reference data has been generated.

If the correct reference data object has been selected, recovery module 125 scans the operating system configuration contained in reference data object 127 according to a predetermined schema.

Figure 6:
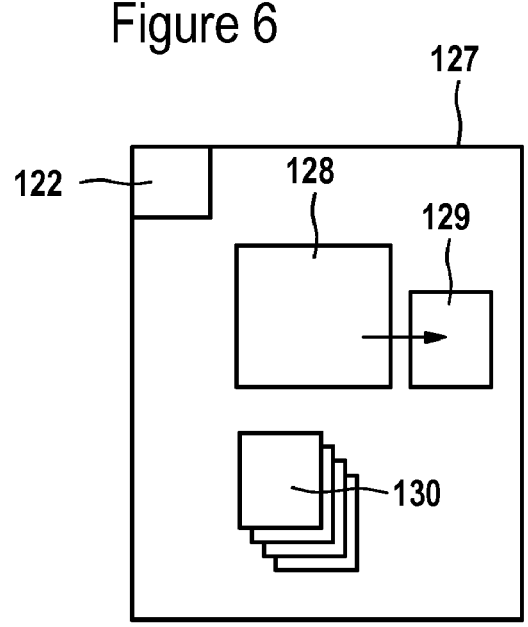
FIG. 6 is a representation that illustrates the content of a reference data object created by a reference data creating module.

According to that schema, the recovery module 125 selects a limited number of configuration entries (e.g., registry keys) from a registry 128 (see FIG. 6). The schema indicates registry entries, which are required to repair the backup installation. In a Windows 2003 environment only a small percentage for example, about 4000-5000 registry entries, will be selected from the overall number of registry entries for further use.

Preferably there are different schemes for different operating systems, e.g., a first schema for Microsoft Windows 2000, and a second schema for Microsoft Windows 2003. These schemes are determined from a prior analysis of a large number of installations employing different hardware-software combinations, i.e., different Windows versions and levels on different hardware. During these analyses, parts of the registry that are not changed by the different Windows versions and levels, and the different hardware (i.e., the hardware-independent entries) are identified.

According to a schema, hardware-dependent registry entries are isolated to the HKEY_LOCAL_MACHINE (system) hive of the registry. Within this hive, any information that is not identified as "unchanged hive or key" will be selected by recovery module 125. In other words, a registry entry will be selected according to the schema if it is hardware dependent, and changes if the hardware is combined with different operating system software. Unchanged hives and keys are, for example, any information about standard windows services (e.g., server, workstation, eventlog, netlogon, ntfs, etc.). For these services, the configuration from the customer system will be used.

According to the schema, for the system and driver files to be analyzed and copied, any file with the extention .exe or .dll in the windows directory or the system32 directory, any file with the extention .sys in the drivers directory, and any file in the inf directory or oemdir directory is selected. Recovery module 125 checks the selected file to see if the version of the file on target system 124 is older then the one on the reference system, if the selected file has a different size, or if the selected file is missing. In these cases, the file will be copied during both a "small repair" and a "full repair", as explained hereinbelow in more detail. Otherwise the file will be skipped during a "small repair" but copied during a "full repair". In the case of a "full repair", the copy is forced independent of the result of the compare.

In a next step, the limited number of registry entries is exported to a new registry file 129, which is later transferred to target system 124 instead of former registry file 128 containing the larger number of registry entries.

The step of limiting the number of registry data can alternatively be carried out during the creation of the reference data objects 120, 127 by means of the reference data creating module 118. In this case, the file size of the reference data objects 120, 127 is reduced.

Preferably, the number of selected and transferred registry entries is limited. The main reason for limiting the number of registry entries is to reduce the time required to apply the registry entries to target system 124. The number of registry entries is limited also because the registries of reference data processing systems 104, 107, 110, and 113 contain entries that could harm customer applications and/or software features of the operating system on target system 124.

In a next step, the files necessary for a repair of target system 124 are transferred from the reference data objects 120, 127 to the target system. The most relevant files are registry file 129 and the hardware driver files 130 required for the target hardware. In addition to these files, the reference data objects 120, 127 contains additional data (see above), which can also be relevant depending on the hardware and software configuration of target system 124.

Recovery module 125 then renames original driver files of target system 124, which are contained in the customer backup. This enables the user of target system 124 to copy selected driver files back to the required location(s) after the target system has been recovered and booted successfully. Otherwise, recovery module 125 would overwrite the original driver files. After renaming the original driver files, recovery module 125 copies driver files 130 to target system 124. Prior to copying files, recovery module 125 sets the attributes and access permissions of the system files on target system 124, if necessary.

When a "small repair" is selected, recovery module 125 compares each driver file 130 to be copied with the corresponding file on target system 124. The file is copied only if it does not exist on target system 124, or if the file from reference data object 127 is newer than the file on the target system 124. If a "full repair" is selected, every driver file 130 required for target system 124 to work is copied, independent of the existence of the file on the target system.

In a next step the limited number of registry entries previously selected by means of recovery module 125 and contained in new registry file 129, are copied to target system 124 and imported into the registry of the target system.

Preferably there are some system-specific registry configurations in target system 124 that are not changed by recovery module 125. These registry configurations can be divided into two categories. The first category comprises registry keys that do not change the system configuration directly. The second category comprises registry keys that comprise information, e.g., the name of the computer, which directly changes the system configurations. The registry keys of both categories are defined in reference data storage 121 and are exported from target system 124 to a safe place before recovery module 125 transfers registry entries 129 to the target system. After the limited number of registry entries 129 are copied to target system 124, the previously exported registry entries for the system-specific configuration are imported again to ensure that these registry keys hold the original values after the target system repair.

Because recovery module 125 uses a given schema to extract the required registry entries, it is possible that some registry entries that should not be changed are extracted. These entries would not prevent the recovering of the restored system but would cause additional manual work (e.g., renaming the system). Additional manual work is prevented by saving these entries before carrying out the recovery step and reapplying them at the end of the recovery process.

In a preferred embodiment of the invention, recovery module 125 checks the function of a number of elements of target system 124 subsequent to the transfer of driver files 130 and registry data 129 to the target system. For example, recovery module 125 checks if the start up files (boot.ini) are configured correctly. If a configuration problem is detected, recovery module 125 will preferably correct it automatically.

Referring to FIG. 7, target system 124 comprises an operating system 131, which is based on original backup data 103 and adapted to underlying hardware 123.

The invention can be implemented as an entirely hardware embodiment, an entirely software embodiment, or an embodiment including both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by, or in connection with, the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, random access memory (RAM), read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements may include local memory employed during actual execution of the program code, bulk storage, and cache memory, which provides temporary storage of at least some program code that reduces the number of times code must be retrieved from bulk storage during program code execution.

Input/output (I/O) devices (including but not limited to keyboards, displays, pointing devices, etc.) may be coupled directly to the system or through intervening I/O controllers.

Network adapters may also be coupled to the system to enable the data processing system to become coupled to other data processing systems, remote printers, or storage devices through intervening private or public networks. Modems, cable modems and Ethernet cards are just a few of the currently available types of network adapters.

This invention can be applied to other hardware and operating systems as well as future versions of operating systems, some of which may require different configuration information and files to be backed up and restored compared to those disclosed in the embodiments described hereinabove. Since these and other modifications and changes varied to fit particular operating requirements and environments will be apparent to those skilled in the art, the invention is not considered limited to examples chosen for purposes of the above described disclosure, and covers all changes and modifications which do not constitute departures from the true spirit and scope of this invention as defined by the appended claims.

What is claimed is:

1. A method of disaster recovery in a data processing system, the steps comprising:
    a) obtaining reference data from a reference data processing system prior to said disaster;
    b) storing said reference data;
    c) storing backup data generated from a source data processing system having first hardware to a target data processing system having second hardware, said first hardware being different from said second hardware, and said stored backup data being unmodified, and wherein said reference data processing system is substantially identical to said target data processing system; and
    d) adapting said backup data to said second hardware of said target data processing system by a remote recovery system using said reference data.

2. The method as recited in claim 1, wherein said reference data comprises hardware-specific data from said reference data processing system.

3. The method as recited in claim 2, wherein said hardware-specific data comprises hardware-specific configuration data and hardware driver data.

4. The method as recited in claim 1, wherein said adapting step (d) comprises at least one of:
    adding missing hardware information and adding missing hardware drivers, to said target data processing system.

5. A data processing program stored on a computer recordable medium for execution in a computer comprising software code portions for performing the steps of:
    a) obtaining reference data from a reference data processing system prior to said disaster:
    b) storing said reference data;
    c) storing backup data generated from a source data processing system having first hardware to a target data processing system having second hardware, said first hardware being different from said second hardware, and said stored backup data being unmodified, and wherein said reference data processing system is substantially identical to said target data processing system; and d) adapting said backup data to said second hardware of said target data processing system by a remote recovery system using said reference data, when said program is run on said computer.

6. The data processing program as recited in claim 5, wherein said reference data comprises hardware-specific data.

7. The data processing program as recited in claim 6, wherein said hardware-specific data comprises hardware-specific configuration data and hardware driver data.

8. The data processing program as recited in claim 5, wherein said adapting step (d) comprises at least one of:
adding missing hardware information and adding missing hardware drivers, to said target data processing system.

9. A computer program product stored on a computer usable medium, comprising computer readable program means for causing a computer to perform the steps of:

a) obtaining reference data from a reference data processing system prior to said disaster;

b) storing said reference data;

c) storing backup data generated from a source data processing system having first hardware to a target data processing system having second hardware, said first hardware being different from said second hardware, and said stored backup data being unmodified, and wherein said reference data processing system is substantially identical to said target data processing system; and d) adapting said backup data to said second hardware of said target data processing system by a remote recovery system using said reference data, when said program is run on said computer.

10. The computer program product as recited in claim 9, wherein said reference data comprises hardware-specific data from said reference data processing system.

11. The computer program product as recited in claim 10, wherein said hardware-specific data comprises hardware-specific configuration data and hardware driver data.

12. The computer program product as recited in claim 9, wherein said adapting step (d) comprises at least one of:
adding missing hardware information and adding missing hardware drivers, to said target data processing system.

13. A non-transitory storage medium having stored thereon a manufactured transient phenomenon comprising computer readable program means for causing a computer to perform the steps of:

a) obtaining reference data from a reference data processing system prior to said disaster:

b) storing said reference data;

c) storing backup data generated from a source data processing system having first hardware to a target data processing system having second hardware, said first hardware being different from said second hardware, and said stored backup data being unmodified, and wherein said reference data processing system is substantially identical to said target data processing system; and d) adapting said backup data to said second hardware of said target data processing system by a remote recovery system using said reference data, when said program is run on said computer.

14. The non-transitory storage medium as recited in claim 13, wherein said reference data comprises hardware-specific data from said reference data processing system.

15. The non-transitory storage medium as recited in claim 14, wherein said hardware-specific data comprises hardware-specific configuration data and hardware driver data.

16. The non-transitory storage medium as recited in claim 13, wherein said adapting step (d) comprises at least one of:
adding missing hardware information and adding missing hardware drivers, to said target data processing system.

17. A disaster recovery system for a data processing system, using backup data originating from a source data processing system, first hardware of said source data processing system being different from second hardware of a target data processing system to which unmodified said backup data is stored, and using reference data obtained from a reference data processing system substantially identical to said target data processing system and stored prior to said disaster, said disaster recovery system comprising means for adapting said backup data to said second hardware of said target data processing system using said reference data.

18. The disaster recovery system as recited in claim 17, wherein said reference data comprises hardware-specific data from said reference data processing system.

19. The disaster recovery system as recited in claim 18, wherein said hardware-specific data comprises hardware-specific configuration data and hardware driver data.

20. The disaster recovery system as recited in claim 17, further comprising means for obtaining said reference data from at least one reference data processing system, each one thereof being characterized by a different hardware and operating system combination.

21. A method for performing disaster recovery of a data processing system, the method comprising using backup data originating from a source data processing system, first hardware of said source data processing system being different from second hardware of a target data processing system to which unmodified said backup data is stored; and adapting said backup data to said second hardware of said target data processing system using reference data obtained from a reference data processing system and stored before said disaster, wherein said reference data processing system is substantially identical to said target data processing system.

22. The method as recited in claim 21, wherein said reference data comprises hardware-specific data from said reference data processing system.

23. The method as recited in claim 22, wherein said hardware-specific data comprises hardware-specific configuration data and hardware driver data.

24. The method as recited in claim 21, further comprising means for obtaining said reference data from at least one reference data processing system, each one thereof being characterized by a different hardware and operating system combination.

* * * * *